United States Patent [19]

Amerine

[11] 4,032,074

[45] June 28, 1977

[54] MATERIAL SPREADER

[75] Inventor: James Dalton Amerine, Marysville, Ohio

[73] Assignee: O. M. Scott & Sons Company, Marysville, Ohio

[22] Filed: Nov. 24, 1975

[21] Appl. No.: 634,906

[52] U.S. Cl. ............................... 239/685; 222/623; 239/687

[51] Int. Cl.² ......................................... A01C 17/00

[58] Field of Search .......... 239/685, 681, 683, 684, 239/687, 288.3, 288.5, 499; 222/177, 178

[56] References Cited

UNITED STATES PATENTS

| | | | |
|---|---|---|---|
| 839,394 | 12/1906 | Klein | 239/685 |
| 2,340,945 | 2/1944 | Ellick | 239/288.5 X |
| 2,661,955 | 12/1953 | Sherer | 239/685 X |
| 2,673,090 | 3/1954 | Blumberg | 239/684 X |
| 2,874,656 | 2/1959 | Bennett | 239/288.5 X |
| 3,559,894 | 2/1971 | Murray et al. | 239/681 X |

Primary Examiner—Evon C. Blunk
Assistant Examiner—Michael Mar
Attorney, Agent, or Firm—J. B. Raden; H. J. Holt

[57] ABSTRACT

A material spreader for the uniform distribution to the soil or to vegetation of particulate material such as fertilizers, pesticides or seeds. The material spreader comprises a hopper for particulate material adapted to be advanced along a given direction, the hopper including an outlet for discharging the particulate material downwardly, an impeller in association with the outlet for broadcasting the discharged material in a generally radial path surrounding the axis of discharge, and a shroud surrounding the impeller aligned to intersect the path of the broadcast material and to deflect the material downwardly to a region of controlled configuration. The shroud is curved, preferably elliptically in horizontal cross-section and has a width along the direction of advance of the spreader which is less than the width along a direction transverse to the direction of advance. The discharge outlet in the spreader is preferably symmetrically aligned with the impeller so that the material is broadcast in a substantially 360° path around the axis of discharge.

7 Claims, 9 Drawing Figures

DIRECTION OF TRAVEL

HEAVY CONCENTRATION

LOW CONCENTRATION

MATERIAL SPREADER

This invention relates to a material spreader device and process. More specifically, this invention relates to a material spreader of the broadcast type used for the distribution of fertilizers, pesticides, seeds or other material in particulate or finely divided form to the soil or to turf or other vegetation and to a process for the distribution of such particulate material.

Two types of material spreaders are in widespread use: drop spreaders in which the material is discharged by gravity along a path whose dimensions conform to those of the discharge opening of the spreader and rotary or broadcast spreaders in which the material is cast out beyond the spreader to cover a region much wider than the dimensions of the spreader. Drop spreaders are very precise and versatile. They produce a controlled distribution pattern, a factor of importance in their use in spreading control products such as herbicides. In addition, the pattern of distribution of a drop spreader does not vary with particle size or density of the particulate material being distributed, as it does in the case of a rotary spreader. However, drop spreaders are slower to use than a rotary due to the narrow spreading width. Moreover, drop spreaders frequently produce streaking because it is difficult to avoid gaps or overlaps between successive distribution paths. Finally, the full width agitator causes a drop spreader to push slightly harder than a rotary and operation in wet turf may be a problem due to low ground clearance.

Rotary spreaders, on the other hand, offer the advantages of speed and ease of application due to the wide swath of distribution and the "feathering" at the edges of the distribution pattern. The feathering, or less dense distribution of particulate material at the edges of the pattern, permits overlap between successive paths and thus tolerates a certain amount of error without a streaking problem. Rotary spreaders push easier than drop spreaders and are better suited to the use of corrosion resistant plastic materials. Rotaries also have the advantage of only a few large metering ports for discharge of the particulate material rather than a series of small ports, thus accommodating larger particle sizes. Rotary spreaders have no problems in tall, wet turf. A major disadvantage of the rotary spreader is the lack of control of the distribution pattern. For this reason, rotary spreaders are not normally recommended for the distribution of control products or for combination products containing a control product. In addition, rotary spreaders produce a less uniform distribution pattern than a drop spreader, and they are susceptible to pattern changes under windy conditions.

An additional disadvantage of a rotary spreader results from the necessity to spread material in a pattern which is asymmetrical along the direction of advance of the rotary spreader. The distribution pattern of a rotary is virtually always asymmetrical front to rear so that the material will not be thrown on the operator and as an aid in obtaining as uniform a distribution pattern as possible. The asymmetrical pattern is usually obtained by discharging the material through an outlet in the bottom of the hopper which is off center — usually behind the center of the hopper with respect to its direction of travel for push-type spreaders, and ahead of the center of the hopper for pull-type or tractor-mounted spreaders. The specific location of the offset position of the discharge outlet depends upon the physical characteristics of the particulate material being distributed, particularly its density and particle size. As a result, rotary spreaders are sensitive to variations in product physical characteristics.

The sensitivity problem with rotary spreaders could be eliminated by dropping material uniformly around or at the center of the impeller. By doing so, the distribution pattern would consist of a series of superimposed circles. Such a distribution pattern, however, in addition to throwing the particulate material back on the operator in the case of a push-type spreader, results in an uneven distribution of particulate material containing a band of heavy particle density at the transverse edges of the pattern.

It is accordingly a principal object of the present invention to provide a material spreader which combines the advantages of both drop and rotary spreaders.

It is an additional object of the present invention to provide a material spreader of the rotary or broadcast type which provides both pattern control and a degree of uniformity of material distribution which has not previously been obtainable with rotary spreaders.

It is still an additional object of this invention to provide a material spreader which possesses the speed and versatility of a rotary spreader without its attendant drawbacks.

It is an additional object of this invention to provide a spreader which may be successfully used for the distribution of all types of turf products without endangering adjacent non-turf areas.

It is still an additional object of this invention to provide a process for the uniform and efficient distribution of particulate material to vegetation.

The foregoing and other objects of this invention are achieved by the provision in a rotary spreader of means for deflecting the broadcast material downwardly to form a pattern of controlled configuration, the deflection means being generally curved in horizontal cross section and having a width along the direction of advance of the spreader which is less than the width along a direction transverse to the direction of advance. In its preferred form, the deflection means of the present invention is in the form of a shroud, the horizontal cross section of which is substantially in the shape of an ellipse. The elliptical distribution pattern produced by such a deflection means produces a 360° distribution pattern, without material build-up at the edges of the pattern, thereby avoiding the necessity for an asymmetrical discharge of the particulate material onto the impeller. Thus, the elliptical shroud provides a desirable distribution pattern using a central drop point onto the impeller. This eliminates pattern variations resulting from variations of the product physical charcteristics. Moreover, the shroud permits the broadcast application of both combination and control products. It retains the advantages of shielding the operator from inclusion within the distribution zone and provides wind protection. An additional advantage of an elliptical shroud is that it reduces the requirement for shroud material for a given width of distribution path as compared with a circular shroud.

Shrouds have been used on agricultural spreaders and on some lawn spreaders for such purposes as wind protection or as stops to limit the extremity of particle distribution. Insofar as is known, however, shrouds for the present purpose or of the present configuration have never previously been used or disclosed.

The invention will be better understood by reference to the accompanying drawing in which.

Figure 1:
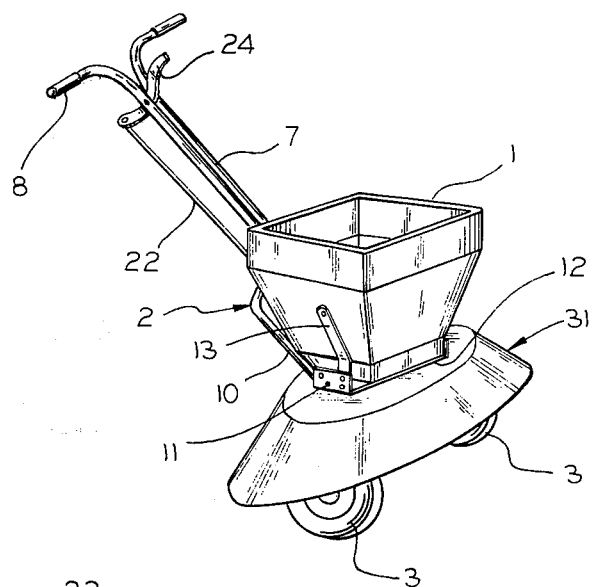
FIG. 1 is a perspective view of one embodiment of a material spreader device of the invention.
Figure 2:
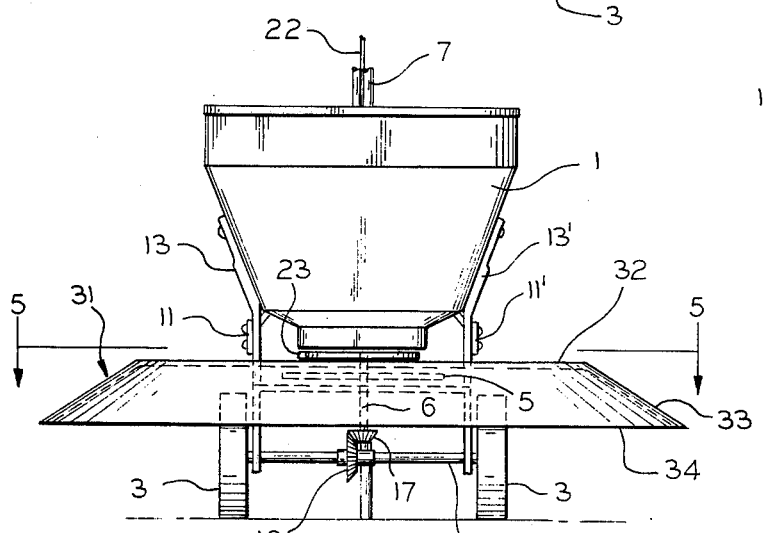
FIG. 2 is a front elevational view of the spreader of FIG. 1.
Figure 3:
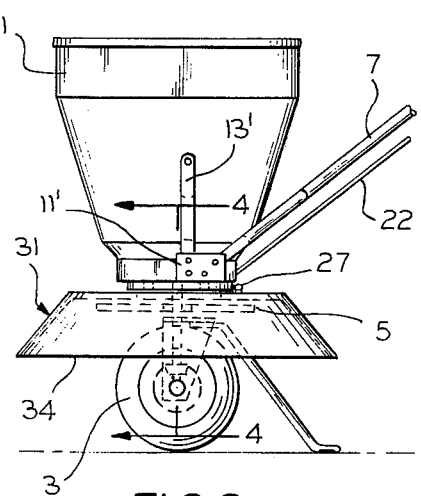
FIG. 3 is a side elevational view of the spreader of FIG. 1.
Figure 5:
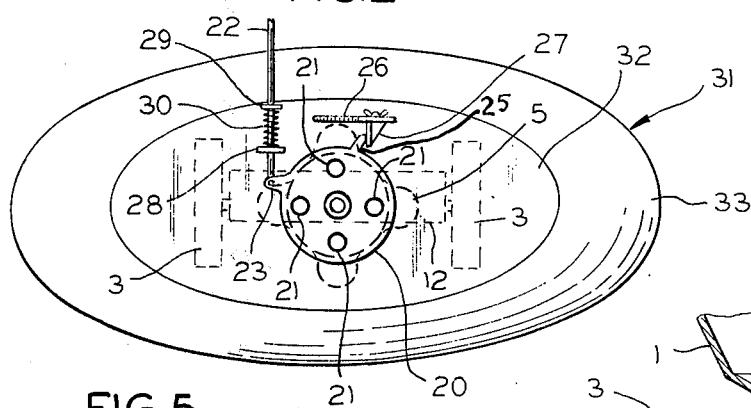
FIG. 5 is a plan view of the shroud as seen along the lines 5—5 of FIG. 2.
Figure 4:
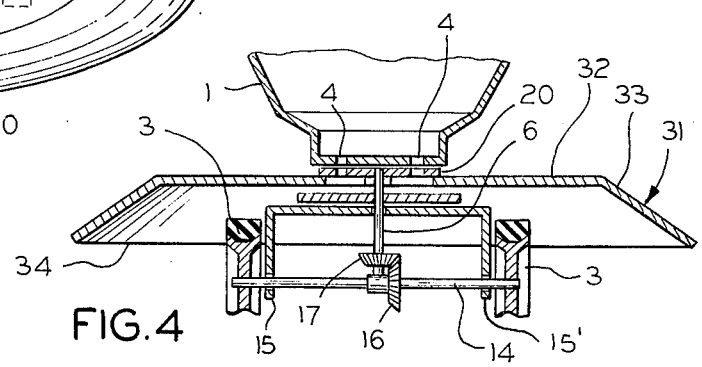
FIG. 4 is a cross-sectional view of a portion of the spreader taken along the lines 4—4 of FIG. 3.
Figure 6:
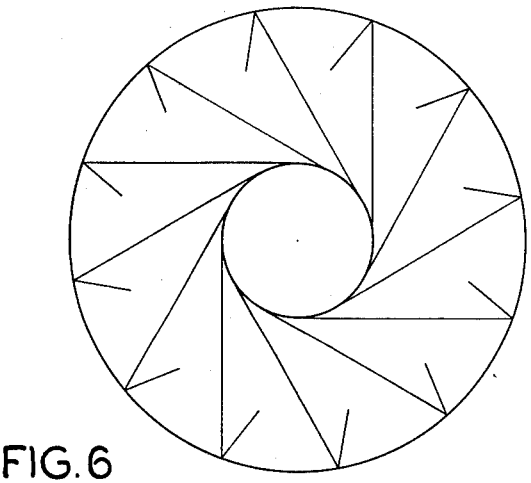
FIG. 6 illustrates the trajectory pattern obtained by a rotary spreader containing a circular shroud in which the particulate material is discharged centrally onto the impeller.
Figure 7:
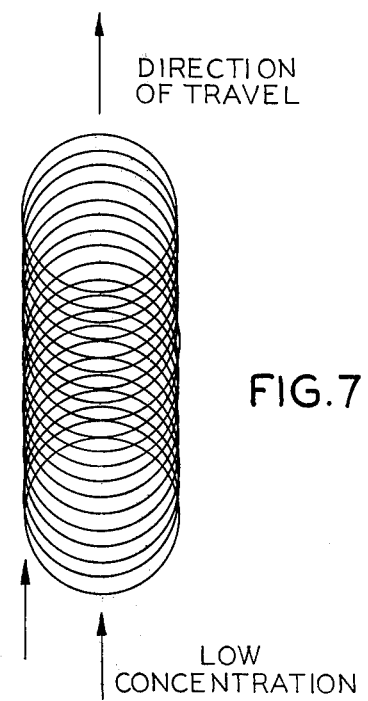
FIG. 7 illustrates the distribution path obtained during spreader travel with a spreader having the trajectory pattern of FIG. 6.

Referring to the drawing, and particularly FIGS. 1–5, the material spreader of the invention comprises a hopper 1 for particulate material supported by a frame shown generally at 2 mounted on a pair of ground engaging wheels 3. The hopper is illustrated with four discharge ports or outlets 4 at the bottom of the hopper for discharge of particulate material to a broadcast means located beneath the hopper. The broadcast means comprises an impeller 5 horizontally and fixedly mounted near the upper end of a shaft 6 rotatably driven at the other end thereof by a powered drive connection. The shaft is centrally and equally spaced from the four outlets 4 so that the impeller 5 is symmetrically aligned with respect to the discharge outlets. A handle 7 consisting of two similar tubular arms projects from the frame 2 and contains an upper pair of handle bars 8 for pushing the spreader.

The frame 2 comprises tubular members 10 and 10′ symmetrically mounted at one end thereof on handle 7 and at the other end thereof on two side pieces 11 and 11′. The side pieces 11 and 11′ are in turn connected by a crossbar 12 extending transversely across and beneath the hopper 1. A pair of supports 13 and 13′ extend vertically from each of the side pieces 11 and 11′ a portion of the vertical height of the hopper and are attached to the hopper for support thereof. The supports 13 and 13′ are offset slightly, support 13 being slightly behind the center of the hopper support, 13′ being the same distance ahead of the center of the hopper. It has been found that least interference with the pattern of particulate material occurs when the supports are thus offset. Axle 14 is journalled within a pair of frame members 15 and 15′ which extend vertically downward from side pieces 11 and 11′ respectively, to which they are attached. One or both wheels are fixedly connected to axle 14 for transmitting power to shaft 6 by means of a bevel gear 16 fixedly mounted on axle 16 in meshing relationship with a smaller bevel gear 17 fixedly mounted on vertical shaft 6 at right angles to horizontal bevel gear 16. It will be seen that the wheels are in power drive connection with the impeller shaft 6 for rotation of the impeller 5.

The amount of particulate material flowing through discharge outlets 4 is metered by adjustment of the size of the outlets. This is accomplished by a circular closure plate 20 rotatably mounted beneath hopper 1 and shaft 6. Plate 20 contains four holes 21 of the same diameter and spacing as outlets 4 in the hopper. Control rod 22 is attached at one end thereof to a projection 23 on plate 20. The control rod extends horizontally beyond the hopper, bends from the horizontal and then passes at an angle generally following handle 7 to the upper end of the handle where it is attached to a pivoted lever 24, secured at its pivot point to handle 7. A second projection 25 on plate 20 cooperates with an indexed rate plate 26 fixedly secured to the top surface 32 of the shroud 31. Rate plate 26 has a stop 27 which is slidably adjustable on the plate by, for example, a screw and wing nut. The control rod 22 passes through a guide 28 fixedly mounted on the top surface 32 of the shroud. A washer 29 is fixedly secured to the control rod 22. A compression spring 30 contained between fixed guide 28 and washer 29 acts to bias plate 20 toward rotation in a clockwise direction. Projection 25 thus rests against stop 27 and locks the plate in a preselected position. Adjustment of lever 24 rotates the plate 20 approximately 45° from a position in which holes 21 are in complete registry with outlets 4 to a position in which they are completely out of registry to meter the amount of particulate material passing through the discharge outlets.

A shroud or deflection means generally identified at 31 is mounted beneath hopper 1 and above the impeller 5 on the cross-bar 12 of the frame as by means of attachment bolts (not shown). The shroud illustrated in the drawing is in the shape of a right truncated elliptical cone, the upper surface of which is closed by a horizontal flat surface 32. The conical surface 33 of the shroud tapers downwardly and outwardly toward the open end 34, the largest diameter of the shroud thus being at its lower open end thereof. It will be apparent that the shroud may also assume other shapes, as for example, a segment of an ellipsoid.

In operation, particulate material flows from the dischaarge outlets downwardly and symmetrically about the axis of the impeller. As the spreader is advanced along a given direction, the rotating impeller broadcasts the particulate material, in a generally horizontal direction in a full 360° circle pattern surrounding the axis of discharge. The conical surface of the shroud intersects the path of the broadcast material and deflects the material downwardly and outwardly to form a series of elliptical patterns, overlapping in the direction of advance of the spreader. Each of the elliptical patterns is feathered to form transverse edges of lighter density than the remainder of the pattern. Thus, the series of overlapping elliptical patterns forms a continuous path of particulate material, the density of which is substantially uniform along the major central portion thereof but which is of lighter density at the edges.

FIGS. 6 through 9 of the drawing illustrate the nature of the improved distribution pattern obtained in accordance with the invention. If particulate material is discharged symmetrically onto the impeller of a rotary spreader with a circular deflection shroud, a trajectory pattern of the type shown in FIG. 6 will be obtained. Parallel segments of this pattern of equal width in the direcion of spreader travel will be seen to have greater particulate density at the transverse edges. This can be seen more clearly in FIG. 7 showing a series of such overlapping circular patterns formed by a travelling spreader. It will be seen that a particle build-up forming a band of heavy concentration appears at the transverse edges. This problem is normally avoided by an asymmetric discharge of the particles onto the impeller to produce only a segment of a complete circle.

Figure 8:
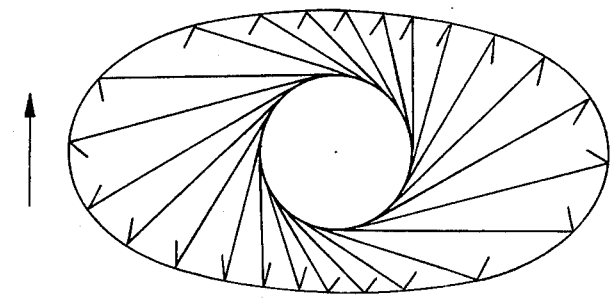
FIG. 8 illustrates the trajectory pattern of a rotary spreader with an elliptical shroud in accordance with the invention.
Figure 9:
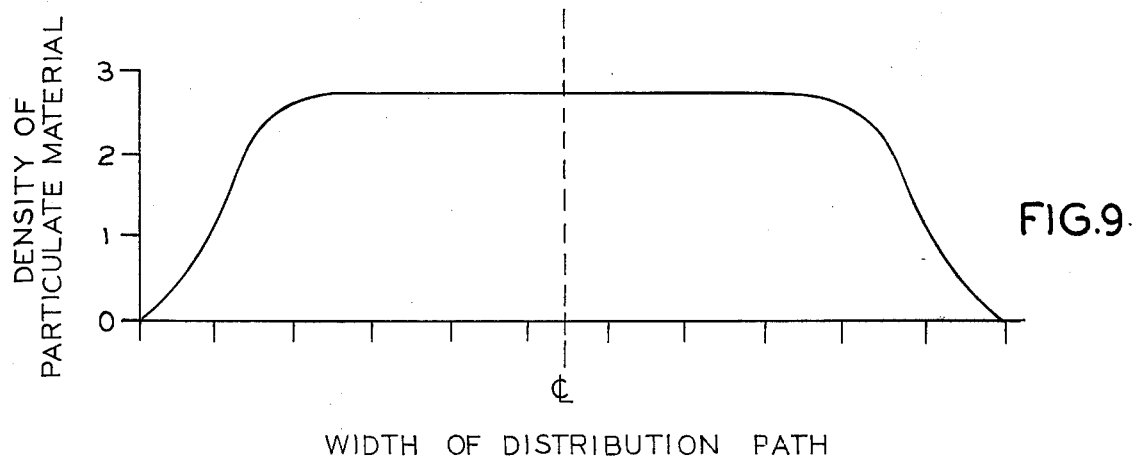
FIG. 9 illustrates graphically the density of particulate material across the width of a distribution path produced in accordance with the invention.

The present invention overcomes the edge-build up problem while permitting substantially 360° particle distribution by distributing the particles in a substantially elliptical pattern. FIG. 8 shows the trajectory path of the particles in such an elliptical pattern. This pattern has substantially uniform density along the major central portion of its width transverse to the direction of travel, with the transverse edges having a lower density. FIG. 9 illustrates graphically the type of particle distribution density actually obtained across the transverse width of a continuous path produced by a series of overlapping elliptical patterns in accordance with the invention.

What is claimed is:

1. In a spreader for particulate material adapted for advance along a given direction having means for discharging said particulate material downwardly from said spreader and means in association with said discharge means for broadcasting said discharged material in a generally radial path surrounding the axis of discharge, the improvement comprising deflection means surrounding said broadcast means tapering downwardly and outwardly, the width of said deflection means along the direction of advance being less than the width along a direction transverse thereto, said deflection means being curved with its radius of curvature being smaller at the transverse end portions thereof, said deflection means aligned to intersect the path of said broadcast material and deflect the material downwardly to form a series of patterns of controlled configuration as the spreader is advanced, the density of said pattern being substantially uniform along the major portion thereof, the density along the transverse edges thereof being less than the major portion.

2. The material spreader of claim 1 in which the deflection means surrounding said broadcast means is substantially elliptical in horizontal cross-section.

3. The material spreader of claim 1 in which the discharge means is symmetrically aligned with the broadcast means so that the material is broadcast in a substantially 360° path around the axis of discharge.

4. The material spreader of claim 1 in which the deflection means is tapered downwardly and outwardly such that the region of controlled configuration is wider along its transverse width than the transverse width of the deflection means.

5. The material spreader of claim 1 in which the spreader comprises a wheel supported hopper, said hopper including a centrally disposed discharge means in the bottom thereof for discharge of metered amounts of the particulate material and said broadcasting means in association with said discharge means being an impeller horizontally mounted beneath the hopper having a powered drive connection with the wheels for rotation as the spreader is advanced, the impeller being symmetrically aligned with the discharge means in the hopper for broadcasting the material in a 360° generally horizontal path.

6. The material spreader of claim 1 in which the deflection means is a truncated elliptical cone.

7. The material spreader of claim 1 in which the deflection means is a segment of an ellipsoid.

* * * * *